June 21, 1932.   G. WETTLAUFER   1,864,033
THRESHING MACHINE
Filed July 19, 1930
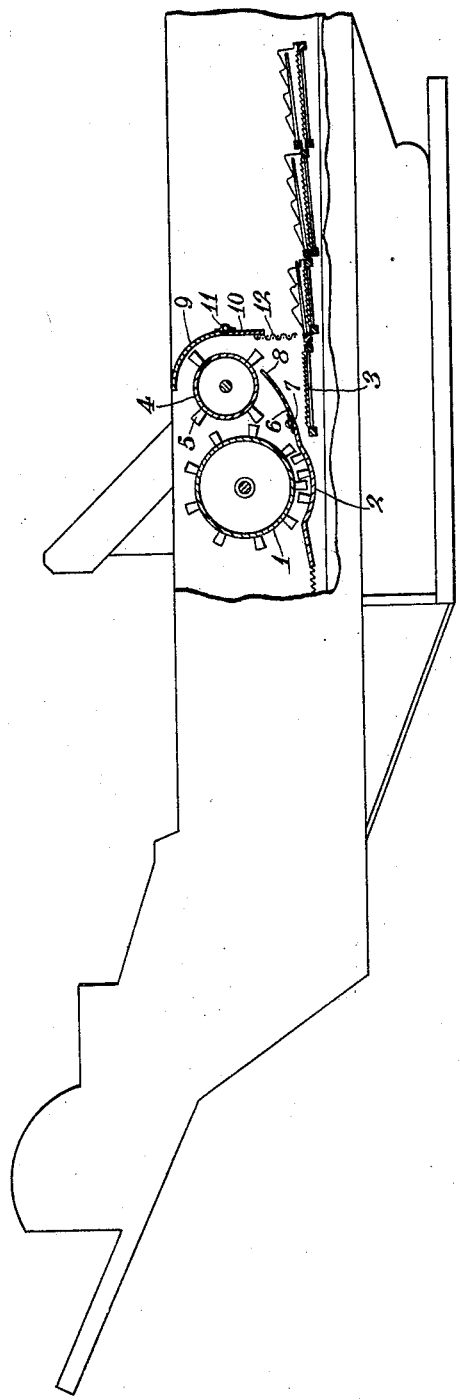
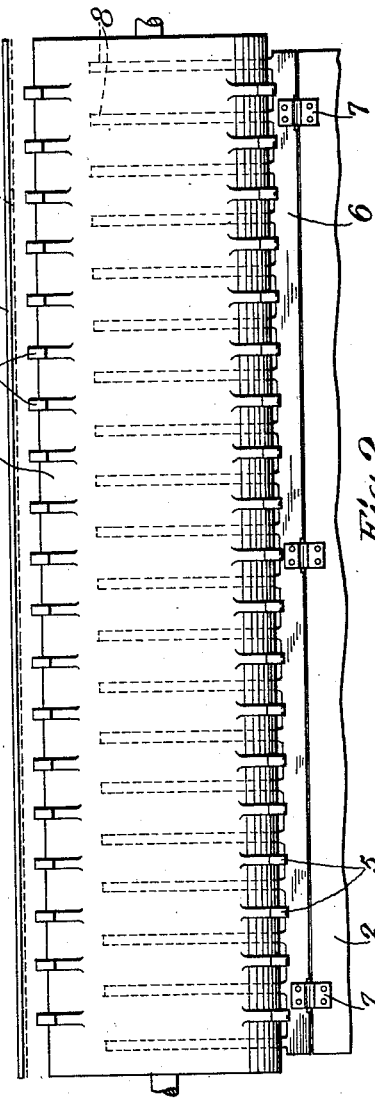
*INVENTOR*
*GEORGE WETTLAUFER*
BY
*ATTORNEY*

Patented June 21, 1932

1,864,033

UNITED STATES PATENT OFFICE

GEORGE WETTLAUFER, OF SAGINAW, MICHIGAN

THRESHING MACHINE

Application filed July 19, 1930. Serial No. 469,007.

This invention relates to bean and pea threshing machines, the object being to increase the efficiency of the threshing operation without making the discarded straw and vines and pods materially finer than that produced by the thresher as ordinarily employed, in other words, to recover additional beans from the usual discard without reducing the discard to a degree of fineness that will impair its value as cattle feed.

The mechanism embodying the invention is simple, relatively inexpensive, effective in operation and requires but little additional power for its operation.

With the foregoing and certain other objects in view, which will appear later in the specification, my invention comprises the devices described and claimed and the equivalents thereof.

In the drawing Fig. 1 is a part sectional part diagrammatic side view of a bean and pea thresher embodying my improvement.

Fig. 2 is a view, as seen from the end of the machine, of the beater cylinder and the tined comb, showing the arrangement of their interdigitating prongs and fingers.

In the drawing I have shown my improvement as applied to a bean and pea thresher of usual construction including the rotatable toothed rear thresher cylinder 1, beneath which is the usual toothed concave 2 that co-acts with it, and the separating rack 3 which is located rearward of the threshing cylinder 1 and is arranged for shaking and vibrating movements.

Numeral 4 indicates the customary beater cylinder which is mounted and arranged for rotation rearwardly of the threshing cylinder 1.

In applying my improvement to a thresher organized as above described I modify the beater cylinder 4 by equipping it with prongs 5 arranged in rows extending lengthwise, the prongs of each row being closely spaced, usually about two inches, approximately the length of a bean pod apart, whereas the teeth of the usual threshing cylinder are much farther apart. The teeth of the improved beater cylinder act upon the material, not so much by tearing or cutting action as by a striking and beating action that has as little tearing action as possible, in order to not impair the value of the discard for cattle feed by reducing it to too great a degree of fineness.

Numeral 6 designates a tined comb that is connected, by a hinge 7, to the rear edge of the concave 2. The tines of the comb are preferably curved upwardly and rearwardly and extend in a general upward and rearward direction from the hinge 7, the free ends 8 of the tines terminating near the under side of the beater cylinder 4. The hinge 7 provides for adjustment of the free ends of the tines toward and from the beater cylinder 4. The comb 6 extends crosswise the machine and across the path of movement of the discard material that is discharged from the threshing cylinder 1.

The tines of the comb interdigitate with the prongs 5 of the beater cylinder 4, which is driven at a much higher speed than the threshing cylinder 1. Usually the threshing cylinder makes about two hundred revolutions per minute, whereas the beater cylinder travels about eight hundred revolutions per minute, these being the speeds that I have found in practice to be suitable for ordinary work.

Preferably the free end portions 8 of the tines are yieldable so that they will give under the action of extremely heavy or tough material and will allow it to pass without unnecessarily breaking it. The free ends of the tines are spaced above the separating rack 3 so that the beans which are knocked loose from the discard material will fall freely upon the bean separating rack 3 and be recovered in the usual way.

A hood 9 encloses the upper and rear parts of the beater cylinder 4. At the lower edge of the hood a baffle 10 is suspended by a hinge 11. A flexible curtain 12 is provided hanging below the edge of the baffle 10, being suspended above the separating rack 3. The curtain may be made of canvas or other suitable material and may conveniently be attached to the lower edge of the baffle 10, or otherwise supported.

In operation, the usual first and second cylinders and the concaves of the ordinary threshing machines perform their work as heretofore, but the discard material from the rear threshing cylinder 1 and concave 2, instead of being driven directly into the wind stacker and thence out of the machine, is directed along the tines of comb 6 rearwardly and upwardly, where it is sharply and roughly beaten by the down-coming prongs 5 of the beater cylinder 4 and is forced along between the comb and the beater cylinder against the hood 9, baffle 10 and flexible curtain 12, dropping down upon the separating rack 3 and thence out of the machine by way of the wind stacker in the usual manner.

If the material is dry and brittle part of the beans that remain stuck in the pods after going through the threshing cylinder 1 are knocked loose and recovered, the pods being so sharply rapped as to dislodge practically all the beans that escape separation in their passage through the threshing cylinders.

If the material is somewhat wet and inclined to come through in bunches or mats, the free ends 8 of the tines will yield downwardly and prevent clogging. In the case of very wet material it may be desirable to increase the amount of clearance between the ends of the tines and the beater cylinder 4. This can be done by suitable adjustment about hinge 7, the tines being held in their adjusted position by known means, not shown.

By the means above described I have provided a simple, inexpensive and effective means of recovering beans that hitherto have been sent to discard and have attained this result without materially increasing the fineness of the discard and, therefore, without injuring its value as cattle feed.

Having thus described my invention, what I claim and desire to secure by Letters Patent is:

In combination a bean thresher having a rotatable toothed rear threshing cylinder, a co-acting toothed concave, a separating rack rearward of said threshing cylinder, a beater cylinder rotatably mounted rearwardly of the threshing cylinder and having prongs spaced apart approximately the length of a bean, a tined comb at the rear edge of said concave and hinged thereto for adjustment toward and from the beater cylinder and disposed across the path of movement of material discharged from the threshing cylinder, the tines of said comb extending upwardly and rearwardly from the hinge, their free ends being near the under side of the beater cylinder and arranged to interdigitate with the prongs thereof during rotation of the beater cylinder, said free end portions of the tines being yieldable, a curved hood enclosing the upper and rear parts of the beater cylinder, a baffle hinged at the lower edge of said hood, a flexible curtain of fabric suspended from the lower edge of the baffle and extending down close to the separating rack.

In testimony whereof, I affix my signature.

GEORGE WETTLAUFER.